US012157133B2

(12) United States Patent
Vincent et al.

(10) Patent No.: US 12,157,133 B2
(45) Date of Patent: Dec. 3, 2024

(54) FLUID SPRAYING FACILITY AND METHOD FOR MOVING AN ASSOCIATED FLUID

(71) Applicant: EXEL INDUSTRIES, Epernay (FR)

(72) Inventors: David Vincent, Paris (FR); Eric Prus, Paris (FR); Philippe Provenaz, Paris (FR)

(73) Assignee: EXEL INDUSTRIES, Epernay (FR)

( * ) Notice: Subject to any disclaimer, the term of this patent is extended or adjusted under 35 U.S.C. 154(b) by 784 days.

(21) Appl. No.: 17/285,475

(22) PCT Filed: Oct. 18, 2019

(86) PCT No.: PCT/EP2019/078338
§ 371 (c)(1),
(2) Date: Apr. 15, 2021

(87) PCT Pub. No.: WO2020/079212
PCT Pub. Date: Apr. 23, 2020

(65) Prior Publication Data

US 2021/0339277 A1 Nov. 4, 2021

(30) Foreign Application Priority Data

Oct. 19, 2018 (FR) ...................................... 1859675

(51) Int. Cl.
*B05B 15/50* (2018.01)
*B05B 15/55* (2018.01)
*B08B 9/049* (2006.01)

(52) U.S. Cl.
CPC .............. *B05B 15/50* (2018.02); *B05B 15/55* (2018.02); *B08B 9/049* (2013.01)

(58) Field of Classification Search
CPC ....... B08B 9/0553; B08B 9/055; B08B 9/053; B05B 12/1481; B05B 15/50; B05B 15/52; B05B 15/58; B05B 15/55
(Continued)

(56) References Cited

U.S. PATENT DOCUMENTS 3,938,912 A * 2/1976 Sakamoto .............. B65G 53/30
417/900
6,037,010 A * 3/2000 Kahmann ........... B05B 12/1481
239/113
(Continued)

FOREIGN PATENT DOCUMENTS

DE 9111600 U1 11/1991
EP 1439344 A2 7/2004
(Continued)

OTHER PUBLICATIONS

INPI Rapport de Recherche Préliminaire for Patent Application No. FR 1859675, Jul. 31, 2019, 2 pp.
(Continued)

*Primary Examiner* — Laura C Guidotti
(74) *Attorney, Agent, or Firm* — Soquel Group LLC

(57) ABSTRACT

A fluid spraying facility including a fluid circulation pipe and a scraper that can circulate in the pipe in order to push back the fluid present in the pipe as it moves forward, the pipe and the scraper each having a circular section, the pipe having an inner diameter, the scraper having an outer diameter, the outer diameter having a first value. A difference between the inner diameter of the pipe and the first outer diameter value of the scraper is greater than or equal to 100 micrometers, preferably greater than or equal to 200 micrometers.

11 Claims, 6 Drawing Sheets

(58) Field of Classification Search
USPC ..................................................... 15/104.061
See application file for complete search history.

(56) References Cited

U.S. PATENT DOCUMENTS

| | | | | |
|---|---|---|---|---|
| 6,176,938 | B1 * | 1/2001 | Palmer ................ | F16L 55/1283 134/8 |
| 6,438,782 | B1 | 8/2002 | Palmer | |
| 7,347,649 | B2 * | 3/2008 | Duerr .................. | B05B 12/1481 406/14 |

FOREIGN PATENT DOCUMENTS

| | | | | |
|---|---|---|---|---|
| JP | 1977108956 U | 8/1977 | | |
| JP | 1987014980 A | 1/1987 | | |
| JP | 1999070348 A | 3/1999 | | |
| JP | 20022143799 A | 5/2002 | | |
| JP | 2007136295 A | 6/2007 | | |
| JP | 2010119926 A | 6/2010 | | |
| WO | WO 2021009046 A1 * | 1/2021 | ............. | B05B 12/14 |

OTHER PUBLICATIONS

PCT International Search Report for Patent Application No. PCT/EP2019/078338, Jan. 16, 2020, 2 pp.
EPO Patent Translation for DE9111600, Aug. 26, 2019, 5 pp.
EPO Patent Translation for EP1439344, Aug. 26, 2019, 9 pp.
EP Translation for Publication No. JP1987014980.
EP Translation for Publication No. JP1977108956.
JP Translation for Publication No. JP2010119926.
JP Translation for Publication No. JP2007136295.
JP Translation for Publication No. 20022143799.
JP Abstract for Publication No. JP1977108956.

* cited by examiner

FLUID SPRAYING FACILITY AND METHOD FOR MOVING AN ASSOCIATED FLUID

CROSS-REFERENCE TO RELATED APPLICATIONS

This application claims benefit under 35 USC § 371 of PCT Application No. PCT/EP2019/078338 entitled FLUID-SPRAYING FACILITY AND METHOD FOR MOVING AN ASSOCIATED FLUID, filed on Oct. 18, 2019 by inventors David Vincent, Eric Prus and Philippe Provenaz. PCT Application No. PCT/EP2019/078338 claims priority of French Patent Application No. 18 59675, filed on Jul. 13, 2018.

FIELD OF THE INVENTION

The present invention relates to a fluid spraying facility. The present invention also relates to a method for moving a fluid in such a fluid spraying facility.

BACKGROUND OF THE INVENTION

Fluid spraying facilities are used in many applications, in particular for spraying paints or other coating products. In these facilities, the fluid to be sprayed flows through a pipe to a spraying device such as a gun.

It is frequently necessary to clean the inside of the fluid circulation pipe to remove all traces of the fluid, for example to prevent a deposit from appearing if the facility is not used for a long time or, if different fluids are likely to be sprayed successively by the same facility, to avoid contamination of the fluid with traces of the previously sprayed fluid.

The cleaning of the inside of the pipe is generally carried out using a scraper, i.e., an instrument designed to circulate in the pipe in order to remove any traces of the fluid present by rubbing against the inner surface of the pipe. Scrapers are generally instruments having at least cylindrical portions of a diameter equal to the inner diameter of the pipe. The cylindrical portions are elastomeric seals, for example, which rub against the inner surface of the pipe. The scraper ensures the seal between its upstream and downstream portions. It then pushes back the fluid present as it moves forward to a portion of the pipe designed to allow the recovery or evacuation of the fluid thus collected.

However, the use of such scrapers generates significant wear both on the scrapers themselves and on the pipes in which they circulate, since the scrapers rub against the inner surface of the pipe at each of their passages. This results in the need for frequent replacement of both the scrapers and the circulation pipe.

SUMMARY OF THE INVENTION

The purpose of the invention is to provide a fluid spraying facility that requires less maintenance than state-of-the-art paint spraying facilities.

For this purpose, the invention relates to a fluid spraying facility comprising a fluid circulation pipe and a scraper that can circulate in the pipe, the scraper being configured to push back the fluid present in the pipe as it moves forward when the scraper circulates in the pipe, the pipe and the scraper each having a cylindrical cross-section, the pipe having an inner diameter, the scraper having an outer diameter, the outer diameter having a first value, a difference between the inner diameter of the pipe and the first value of the outer diameter of the scraper being greater than or equal to 100 micrometers, preferably greater than or equal to 200 micrometers.

According to other advantageous but optional aspects of the invention, the fluid spraying facility comprises one or more of the following features, considered alone or according to all technically possible combinations:

- the paint spraying facility comprises a holding system, capable of preventing a relative translational movement of the scraper in relation to the pipe when the scraper is inserted in the pipe;
- the pipe extends along a first axis, the scraper extending along a second axis and configured to move in translation relative to the pipe along the first axis when the first axis and the second axis are merged, the holding system being configured to rotate the scraper about an axis perpendicular to the first axis such that an angle between the first axis and the second axis is strictly greater than zero, preferably greater than or equal to 5 degrees.
- the scraper comprises a magnet having a north pole and a south pole, the poles of the magnet being aligned along a third axis, an angle between the second axis and the third axis being strictly greater than zero, preferably greater than or equal to 5 degrees, the holding system comprising a magnetic field generator capable of generating a magnetic field in at least a portion of the pipe intended to align the third axis and the first axis.
- the scraper comprises a ferromagnetic element, the holding system comprising a magnetic field generator capable of generating a magnetic field in at least a portion of the pipe intended to bring the ferromagnetic element closer to the magnetic field generator so as to press the scraper against an inner surface of the circulation pipe.
- the magnetic field generator is in contact with an outer surface of the circulation pipe.
- the magnetic field generator is at least partially between an inner and an outer surface of the circulation pipe.
- the holding system is configured to increase the outer diameter of at least a portion of the scraper from the first outer diameter value to a second outer diameter value equal to the inner diameter of the pipe.
- the scraper extends along a second axis, the scraper being configured to be crushed along the second axis when a pressure in the pipe is greater than or equal to a predetermined pressure value, the crushing causing said portion of the scraper to increase in outer diameter from the first outer diameter value to the second outer diameter value.
- the scraper comprises a shell and an elastic element, the shell having two end walls delimiting the shell along the second axis, the elastic element being received inside the shell and being configured to exert a force on the two end walls intended to move the two end walls away from each other along the second axis, the shell being configured so that when the end walls are brought together along the second axis, the outer diameter of at least a portion of the shell increases to the second outer diameter value.
- the scraper comprises two end portions and an elastomeric crushing portion, the crushing portion having a circular cross-section in a plane perpendicular to the second axis and being interposed along the second axis between the two end portions, the crushing portion being configured to exert a force on the end portions intended to move the end portions away from each other and to radially deform outwardly when the scraper is crushed.

the scraper comprises a magnet, the holding system comprising at least one ferromagnetic element configured so that, when the scraper is received in the pipe, the magnet exerts a force intended to bring the scraper closer to the ferromagnetic element so as to press the scraper against an inner surface of the circulation pipe.

the ferromagnetic element is a longitudinal ferromagnetic element wound around the circulation pipe.

the facility also includes a sheath surrounding the circulation pipe, with each ferromagnetic element interposed between the sheath and the circulation pipe.

The invention also relates to a method for moving a fluid in a fluid spraying facility comprising a fluid circulation pipe, comprising a step of a scraper circulating in the pipe, the scraper pushing back the fluid present in the pipe as it moves forward during the circulation step, the pipe and the scraper each having a cylindrical section, the pipe having an inner diameter, the scraper having an outer diameter, the outer diameter having a first value during the circulation step, a difference between the inner diameter of the pipe and the first value of the outer diameter of the scraper is greater than or equal to 100 micrometers, preferably greater than or equal to 200 micrometers.

According to a particular embodiment, the method is carried out in a facility in which the scraper extends along a second axis, this method further comprising a step of increasing the pressure from a first pressure value to a second pressure value and a step of crushing the scraper along the second axis under the effect of the pressure, the crushing causing an increase in the outer diameter of at least a portion of the scraper from the first outer diameter value to a second outer diameter value, equal to the inner diameter of the pipe.

BRIEF DESCRIPTION OF THE DRAWINGS

Features and advantages of the invention will appear more clearly upon reading the following description, provided solely as a non-limiting example, and made in reference to the appended drawings, in which.

DETAILED DESCRIPTION OF EMBODIMENTS

Figure 1:
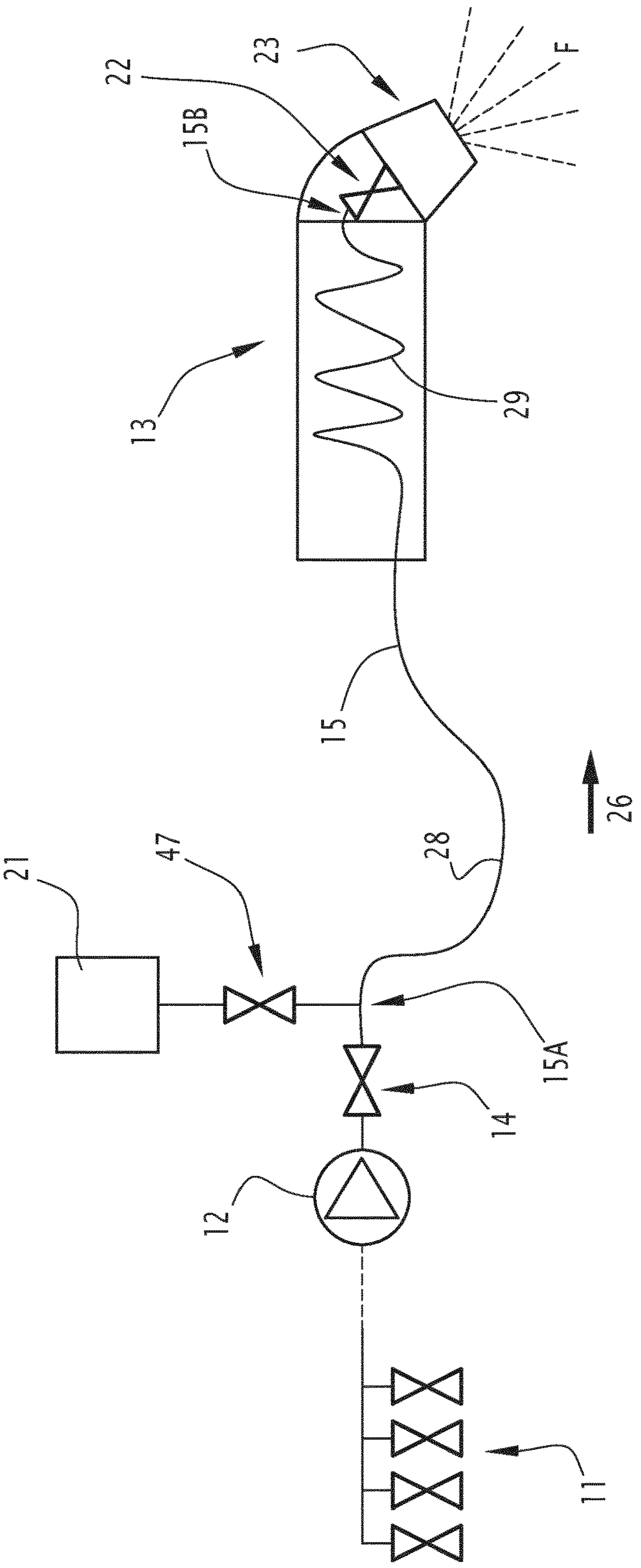
FIG. 1 is a schematic illustration of a first example of a fluid spraying facility comprising a fluid circulation pipe and a scraper.

A first example exemplary facility for spraying a fluid 10 is shown in FIG. 1.

The facility 10 is configured to spray a first fluid F.

The facility 10 for example comprises a color-changing unit 11, a pump 12 and a member 13 for spraying the first fluid F, such as a paint gun or a sprayer.

The facility 10 further includes a fluid F circulation pipe 15, a scraper 20 and at least one injector 21.

The color-changing unit 11, the pump 12, the circulation pipe 15 and the spraying member 13 jointly form a circuit 16 for circulation of the first fluid F. The circuit 16 is in particular capable of conducting the first fluid F from the color-changing unit 11 to the spraying member 13.

The first fluid F is for example a liquid, such as a paint or another coating product.

According to one embodiment, the first fluid F includes a set of electrically conductive particles, in particular metal particles, such as aluminum particles.

The color-changing unit 11 is configured to supply the pump 12 with the first fluid F. In particular, the color-changing unit 11 is configured to supply the pump 12 with a plurality of first fluids F, and to switch the supply of the pump 12 from one first fluid F to another first fluid F.

In particular, each of the first fluids F with which the color-changing unit 11 is capable of supplying the pump 12 is, for example, a paint having a different color from the colors of the other first fluids F.

The pump 12 is capable of injecting, into the circulation pipe 15, a flow rate of the first fluid F received from the color-changing unit 11. For example, the pump 12 is connected to the circulation pipe 15 by a valve 14.

The pump 12 is for example a gear-type pump.

The spraying member 13 is capable of receiving the first fluid F and spraying the first fluid F.

For example, the spraying member 13 includes a valve 22 and a spray head 23.

The spraying member 13 is for example mounted on a moving arm capable of orienting the spraying member 13 toward an object on which the first fluid F must be sprayed.

The valve 22 is configured to connect the circulation pipe 15 to the spray head 23, and to switch between an open configuration allowing the passage of first fluid F from the circulation pipe 15 to the spray head 23 and a closed configuration preventing this passage.

The spray head 23 is configured to spray the first fluid F received from the valve 22.

The fluid circulation pipe 15 is configured to conduct the first fluid F received from the valve 14 to the spraying member 13.

The fluid circulation pipe 15 is cylindrical. For example, the fluid circulation pipe 15 has a circular section and extends along a first axis A1.

According to one embodiment, the fluid circulation pipe 15 is straight. In a variant, the fluid circulation pipe 15 is a curved pipe for which the first axis A1 is defined locally at any point of the fluid circulation pipe 15 as being perpendicular to a plane in which the section of the fluid circulation pipe 15 is circular.

The fluid circulation pipe 15 has an inner surface 25 delimiting an aperture of the fluid circulation pipe 15 in a plane perpendicular to the first axis A1.

Figure 2:
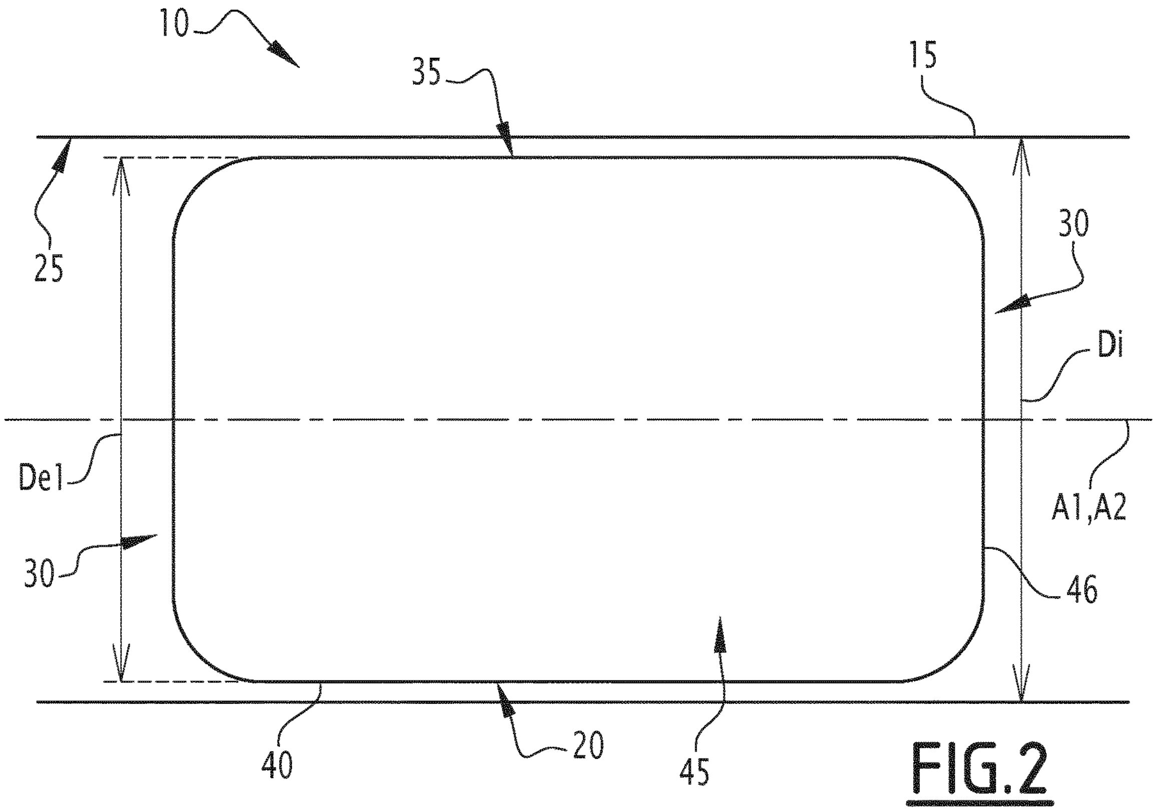
FIG. 2 is a partial schematic sectional illustration of the first example of a fluid spraying facility.
Figure 3:
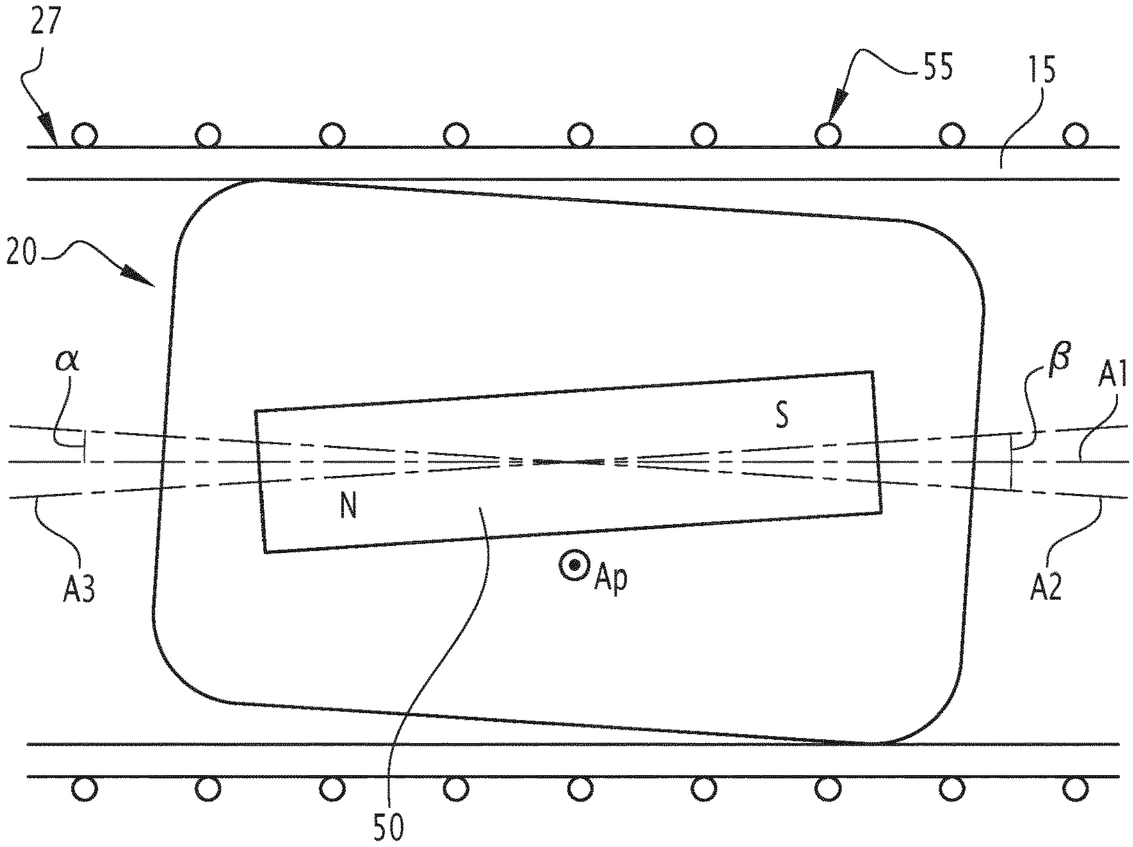
FIG. 3 is a partial schematic sectional illustration of a second example of a fluid spraying facility.

The fluid circulation pipe 15 further has an outer surface 27, which is visible in FIG. 3. In order to simplify FIGS. 1, 2 and 4 to 7, the outer surface 27 is only shown in FIG. 3.

An upstream direction and a downstream direction are defined for the circulation pipe 15. The upstream direction and the downstream direction are defined in that, during the spraying of the first fluid F, the first fluid F circulates in the circulation pipe 15 from upstream to downstream.

For example, the pump is configured to inject the first fluid at an upstream end 15A of the circulation pipe 15 while a downstream end 15B of the circulation pipe 15 is connected to the sprayer to allow the first fluid F to circulate from upstream to downstream from the pump to the sprayer through the circulation pipe 15. This is shown in FIG. 1 by an arrow 26.

According to the example shown in FIG. 1, the fluid circulation pipe 15 includes a first portion 28 and a second portion 29.

The circulation pipe 15 has a length greater than or equal to 50 centimeters, for example greater than or equal to one meter. According to one embodiment, each of the first portion 28 and the second portion 29 has a length greater than or equal to one meter.

The first portion 28 is arranged upstream from the second portion 29.

The first portion 28 is for example configured to deform so as to follow the movement of the spraying member 13.

The second portion 28 is, for example, accommodated in the spraying member 13 and movable therewith.

The second portion 29 is, for example, helical.

An inner diameter Di is defined for the fluid circulation pipe 15. The inner diameter Di is measured in a plane perpendicular to the first axis A1 between to diametrically opposite points of the inner surface 25.

The inner diameter Di is, for example, between 3.8 and 6.2 mm. It should be noted that the inner diameter Di of the circulation pipe 15 may vary.

The fluid circulation pipe 15 is, for example, made from a metallic material. In a variant, the fluid circulation pipe 15 is made from a polymer material.

The scraper 20 is configured to circulate in the fluid circulation pipe 15 in order to push the first fluid F present in the inner surface 25 back in front of it during its movement in the fluid circulation pipe 15. In particular, the scraper 20 is configured to clean the inner surface 25, that is to say, to leave behind it an inner surface 25 covered with a quantity of first fluid F smaller than the quantity covering the inner surface 25 before the passage of the scraper 20, for example to remove all of the first fluid F covering the inner surface 25 of the portions of the pipe 15 in which the scraper 20 circulates.

"Push back in front of it" means that the scraper 20, circulating in a direction in the fluid circulation pipe 15, imposes a movement in this direction on the first fluid F that is received in the portion of the pipe 15 in the direction in which the scraper 20 moves. For example, a scraper 20 moving from upstream to downstream imposes a movement in the downstream direction on the first fluid F located downstream from the scraper 20.

The scraper 20 extends along a second axis A2.

The scraper 20 includes at least one portion having a circular section in a plane perpendicular to the second axis A2.

According to the example of FIG. 2, the scraper 20 is substantially cylindrical and has a symmetry of revolution around the second axis A2.

The scraper 20 is provided to circulate in the circulation pipe 15 when the scraper 20 is received in the aperture of the circulation pipe 15 and the first axis A1 is combined with the second axis A2, as shown in FIG. 2.

The scraper 20 has an outer diameter. The outer diameter is the outer diameter of the portion of the scraper 20 having the largest outer diameter in a plane perpendicular to the second axis A2.

The outer diameter has a first value De1.

The first value De1 is strictly less than the inner diameter Di of the circulation pipe 15.

A difference between the inner diameter Di of the circulation pipe 15 and the first value De1 is greater than or equal to 100 micrometers (μm). For example, the difference is greater than or equal to 200 μm.

The difference is less than or equal to 300 μm.

According to one embodiment, the difference is equal to 200 μm.

The scraper 20 has two end faces 30 delimiting the scraper 20 along the second axis A2. A length of the scraper 20 measured along the second axis A2 between the two end faces 30, is comprised between the inner diameter Di of the circulation pipe 15 and twice the inner diameter Di.

The scraper 20 further has a side face 35 delimiting the scraper 20 in a plane perpendicular to the second axis A2. When the scraper 20 is substantially cylindrical, the outer diameter is measured between two diametrically opposite points of the side face 35.

The scraper 20 for example includes a shell 40 delimiting a chamber 45. In this case, the end faces 30 and the side face 35 are outer faces of the shell 40. In particular, the shell 40 includes two end walls 46 that separate, along the second axis A2, the chamber 45 from the outside of the shell 40. In this case, the end faces 30 are faces of the end walls 46.

The end walls 46 are for example flat walls perpendicular to the second axis A2.

The shell 40 is for example made from polytetrafluoroethylene (PTFE), polyethylene, a polyolefin, polyether ether ketone (PEEK), polyoxymethylene (POM), or polyamide.

In a variant, the scraper 20 is solid, that is to say, no chamber 45 is delimited by the shell 40. In this case, the scraper 20 will be made from a material having good elastic properties, such as an elastomer, in particular a perfluorinated elastomer, resistant to solvents.

The injector 21 is configured to inject a second fluid into the circuit 16, in particular into the circulation pipe 15. For example, the injector 21 is configured to inject a stream of second fluid having a flow rate controllable by the injector 21 into the circulation pipe 15.

The injector 21 is for example configured to inject the second fluid into the upstream end 15A of the circulation pipe 15. In a variant, the injector 21 is configured to inject the second fluid into the downstream end 15B of the circulation pipe 15, or is configured to inject the second fluid either into the upstream end 15A or into the downstream end 15B.

According to the example of FIG. 1, the injector 21 is connected by a valve 47 to the circulation pipe 15.

The second fluid is for example a separate fluid from the fluid F to be sprayed. For example, the second fluid is a liquid, sometimes called "cleaning liquid". The liquid is in particular a solvent capable of dissolving or diluting the first fluid F. For example, when the first fluid F is a paint with an aqueous base, the liquid is water. It should be noted that the type of solvent used may vary, in particular depending on the nature of the first fluid F.

It should also be noted that liquids other than solvents may be used as second fluid.

In a variant, the second fluid is a first fluid F intended to be sprayed after the first fluid F present in the circulation pipe 15, for example a first fluid F having a different color from the first fluid F present in the circulation pipe 15. According to another variant, the second fluid is a gas such as compressed air.

Many types of injector 21 can be used in the facility 10, as a function of the second fluid to be injected. For example, the injector 21 is a gear-type pump, or a compressor capable of generating a gas stream.

It should be noted that, although the injector 21 has been described previously as a separate device from the pump 12, it is conceivable for the role of the injector 21 to be performed by the pump 12, for example if the color-changing unit 11 comprises a second fluid reservoir that the pump 12 is then capable of injecting into the pipe 15.

A first example of a method for moving the first fluid F into the facility 10 will now be described.

The method is for example a method for cleaning the inner surface 25 of the pipe 15. It should be noted that applications of the method other than cleaning the pipe 15 can be considered.

During an initial step, first fluid F is present in the aperture of the circulation pipe 15. For example, the first fluid F partially covers the inner surface of the circulation pipe 15.

During a circulation step, the scraper 20 circulates in the circulation pipe 15. For example, the scraper 20 is inserted at one end 15A, 15B of the circulation pipe 15 and propelled to the other end 15A, 15B of the circulation pipe 15 by a stream of second fluid.

The stream of second fluid then exerts, on one of the end faces 30, a force tending to propel the scraper into the circulation pipe 15 along the first axis A1.

During the circulation step 20, the first axis A1 and the second axis A2 are combined.

Under the effect of the stream of second fluid, the scraper 20 circulates in the circulation pipe 15. For example, when the stream of second fluid is injected into the upstream end 15A of the pipe 15, the scraper 20 circulates from upstream to downstream. It should be noted that the circulation direction of the scraper 20 is capable of varying, for example if the stream of second fluid is injected into the downstream end 15B of the pipe 15.

During its circulation, the scraper 20 pushes the first fluid F present in the circulation pipe 15 back in front of it, thus allowing the recovery of the first fluid F. For example, a recovery valve of the first fluid F emerging in the downstream end of the pipe 15 allows the first fluid F pushed back by the scraper 20 to exit. In a variant, the first fluid F leaves the circulation pipe through the valve 22 of the spraying member 13.

The inner surface 25 of the circulation pipe 15 is therefore cleaned, since the scraper pushes the first fluid F present on the inner surface 25 of the pipe 15 back in front of it.

Since the difference between the first outer diameter value De1 of the scraper 20 and the inner diameter Di of the circulation pipe 15 is greater than or equal to 100 μm, the friction between the scraper 20 and the inner surface 25 is limited. The wear of the scraper and the circulation pipe 15 is therefore lower than for the facilities of the state of the art. However, the first fluid F is effectively collected by the scraper 20.

A difference greater than or equal to 200 μm particularly decreases the friction and therefore the wear.

In the second, third and fourth exemplary facilities mentioned hereinafter and their variants, the elements identical to the first example of FIG. 2 and the first exemplary movement method are not described again. Only the differences are shown.

A second exemplary facility 10 is shown in FIG. 3.

The facility 10 includes a holding system configured to prevent a relative translational movement of the scraper 10 with respect to the circulation pipe 15 when the scraper 20 is inserted into the circulation pipe 15, and which is no longer desired when the first fluid F is moved in the circulation pipe 15.

The holding system is in particular configured to pivot the scraper 20 around a pivot axis Ap. The pivot axis Ap is perpendicular to the first axis A1.

More specifically, the holding system is configured to pivot the scraper 20 between a first position in which the first axis A1 and the second axis A2 are combined and a second position in which an angle α between the first axis A1 and the second axis A2 is strictly greater than zero.

The angle α is for example greater than or equal to 0.5 degrees)(°.

When the scraper 20 is in the second position, as shown in FIG. 3, the scraper 20 is pressed at each of its ends against the inner surface 25 of the circulation pipe 15.

Since the scraper 20 has an outer diameter De1 strictly smaller than the inner diameter Di of the circulation pipe 15, the scraper 20 is capable of moving in the circulation pipe 15 without the second fluid F upstream being set in motion, for example under the influence of gravity. This in particular happens each time the spraying is stopped.

Owing to the holding system, the risk of an unwanted movement of the scraper 20 is limited.

According to one embodiment, the holding system includes a magnet 50 and a magnetic field generator 55.

The magnet 50 is secured to the scraper 20. The magnet 50 is for example accommodated in the chamber 45.

The magnet 50 is for example a permanent magnet, such as a neodymium magnet.

However, embodiments in which the magnet 50 is an electromagnet are also conceivable.

The magnet 50 has a north pole N and a south pole S. The north N and south S poles of the magnet 50 are aligned along a third axis A3.

The third axis A3 is not combined with the second axis A2. In particular, the third axis A3 forms an angle β with the second axis A2 of the scraper 20.

The angle β is greater than or equal to the angle α between the first axis A1 and the second axis A2. The angle β is greater than or equal to 5°.

The magnetic field generator 55 is configured to generate, in at least one portion of the circulation pipe 15, a magnetic field M tending to align the first axis A1 and the third axis A3.

The magnetic field generator 55 is, for example, arranged outside the circulation pipe 15. According to the example shown in FIG. 3, the magnetic field generator is in contact with the outer surface 27 of the circulation pipe 15.

In a variant, the magnetic field generator is at least partially comprised in the circulation pipe 15. In particular, the magnetic field generator is at least partially comprised between the outer surface 27 and the inner surface 25 of the circulation pipe 15.

The magnetic field generator 55 is, for example, an electromagnetic comprising a conductive winding surrounding at least a portion of the circulation pipe 15. In this case, when the electromagnetic 55 is supplied by an electric current, the electromagnet 55 generates, in the circulation pipe 15, a magnetic field M oriented parallel to the first axis A1.

According to the example of FIG. 3, the conductive winding is wound around the circulation pipe 15, and is therefore in contact with the outer surface 27. In a variant, the conductive winding can be comprised between the outer 27 and inner 25 surfaces of the pipe 15. Thus, the conductive winding is integrated into the pipe 15.

According to one variant, the magnetic field generator 55 is a permanent magnet. For example, the magnetic field generator 55 is a permanent magnet when the magnet 50 is an electromagnetic.

According to one specific embodiment, the magnetic field generator 55 includes a permanent magnet and the magnet 50 is a permanent magnet. For example, the permanent magnet of the magnetic field generator 55 is movable relative to the circulation pipe 15 between a first position in which the magnetic field generator 55 generates a negligible magnetic field in a portion of the circulation pipe 15 and a second position in which the magnetic field generator 55 generates, in at least one portion of the circulation pipe 15, a magnetic field M tending to align the first axis A1 and the third axis A3.

According to another embodiment, the magnetic field generator 55 and the magnet 50 are both electromagnets.

The second example method includes a pivoting step.

The pivoting step is for example carried out after the circulation step. In particular, the pivoting step is carried out when the scraper 20 is accommodated in the aperture of the circulation pipe 15, but it is desirable for the scraper 20 not to be able to move in translation along the first axis A1 relative to the circulation pipe 15, for example when the circulation pipe 15 must be moved or the first axis A1 of the circulation pipe 15 has a non-negligible vertical component and the scraper 20 could slide in the circulation pipe 15 under the effect of its weight.

During the pivoting step, the scraper 20 pivots from its first position to its second position.

In particular, the electromagnet 55 generates the magnetic field M, which imposes a magnetic force on the scraper 20 tending to align the third axis A3 with the first axis A1. The scraper 20 therefore pivots around the pivot axis Ap to its second position.

The magnetic force presses the two ends of the scraper 20 against the inner surface 25 of the circulation pipe 15, which prevents, by friction, a translational movement of the scraper along the first axis A1 relative to the circulation pipe 15.

The holding system then makes it possible to keep the scraper 20 in position in a particular portion of the circulation pipe 15 despite the reduction in friction between the scraper 20 and the circulation pipe 15 due to the difference in the inner and outer diameters Di and De1. This immobilization is in particular useful for the case of interruption of the circulation step before the entire pipe 15 has been traveled by the scraper 20.

Figure 4:
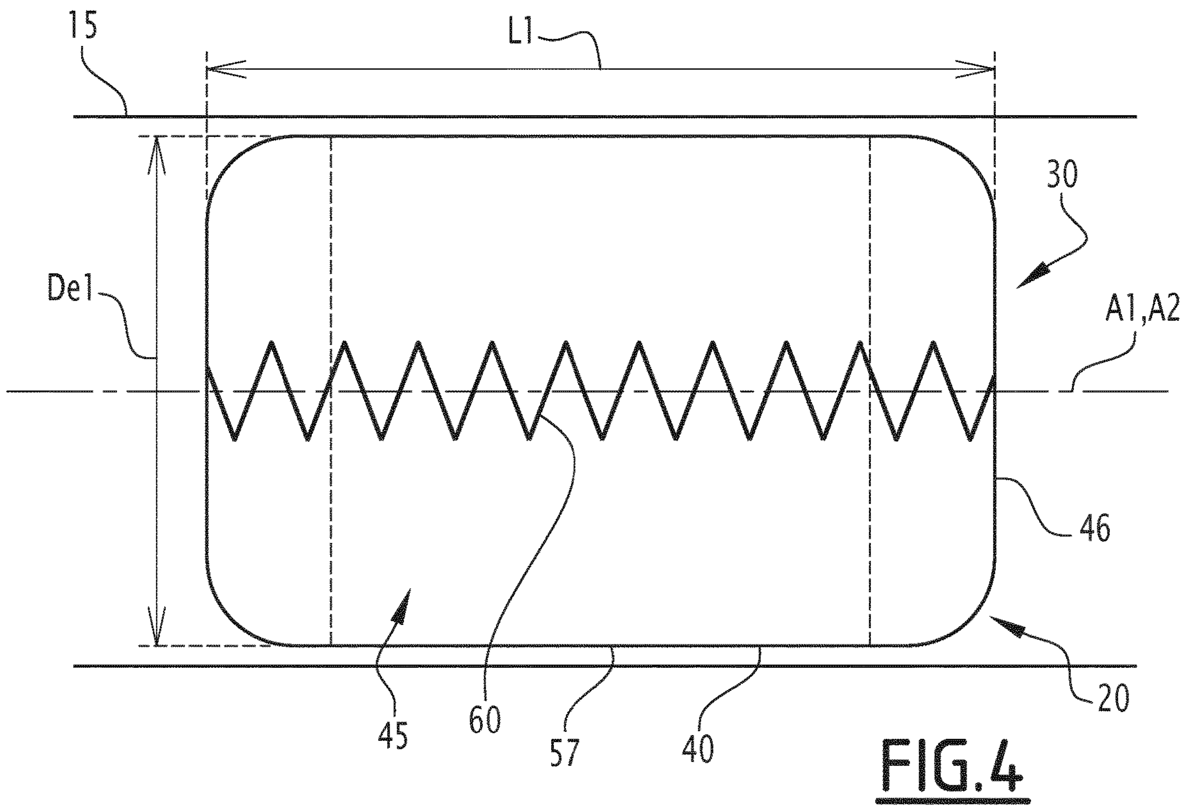
FIG. 4 is a partial schematic sectional illustration of a third example of a fluid spraying facility comprising a pipe, with a pressure in the pipe being equal to a first value.

A third exemplary facility 10 is shown in FIG. 4.

The third example facility 10 also includes a holding system configured to prevent a relative translational movement of the scraper 10 with respect to the circulation pipe 15 when the scraper 20 is inserted in the circulation pipe 15.

The holding system is configured to increase the outer diameter of at least a portion of the scraper 20 from the first diameter value De1 to a second diameter value De2.

The second diameter value De2 is strictly greater than the first diameter value De1.

In particular, the second diameter value De2 is equal to the inner diameter Di.

The injector 21 is able to vary the pressure in the circulation pipe 15 when the exit of the first fluid F through the downstream end of the pipe 15 is prevented, for example when the valve 22 of the spraying member 13 is closed.

In particular, the injector 21 is configured to vary the pressure in the circulation pipe between a first pressure value and a second pressure value.

The first pressure value is a typical pressure value for the operation of the facility 10 when the scraper 20 circulates in the circulation pipe 15.

The first pressure value is, for example, between 2 bar and 8 bar. It should be noted that the first value can vary.

The second pressure value is strictly greater than the first pressure value. The second pressure value is for example greater than or equal to 10 bar. According to one embodiment, the second pressure value is equal to 10 bar, to within 500 millibar.

The scraper 20 is configured to be crushed along the second axis A2 when the pressure in the circulation pipe 15 is greater than or equal to a predetermined pressure threshold.

Figure 5:
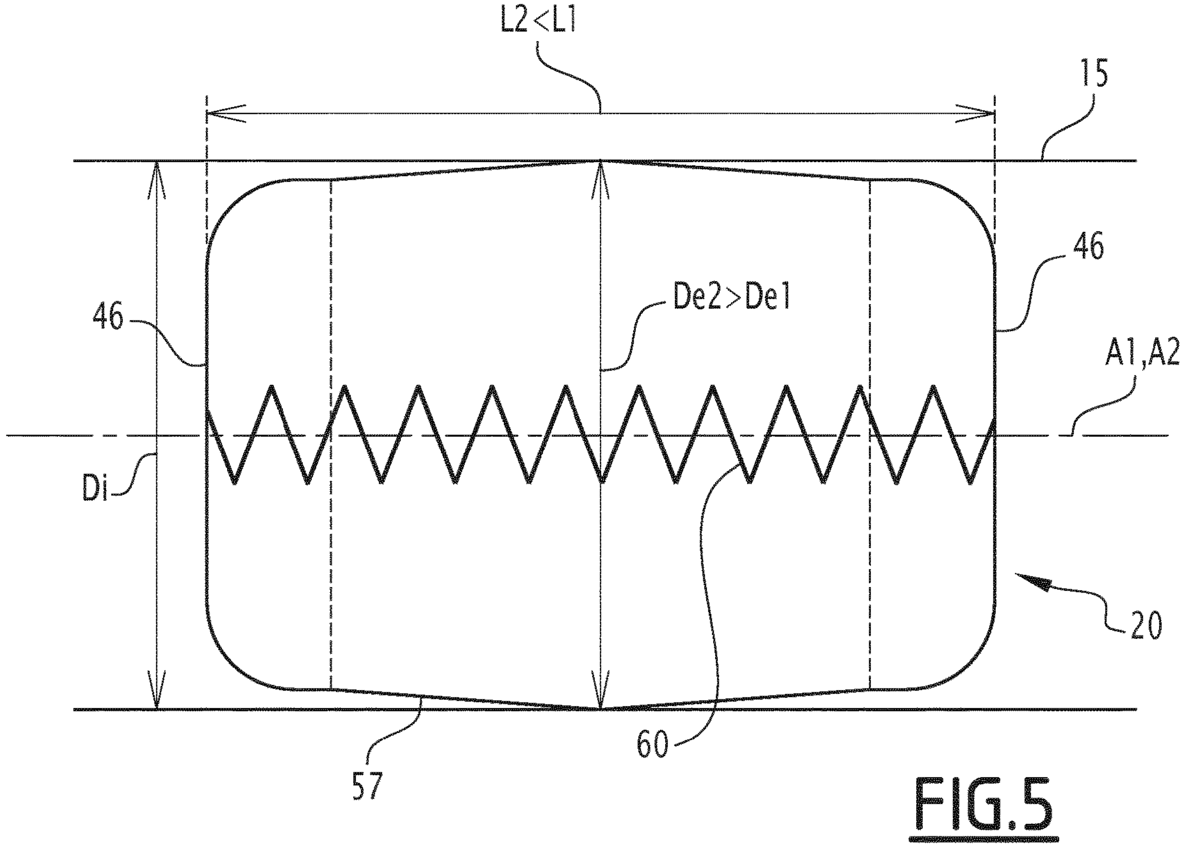
FIG. 5 is a partial schematic sectional illustration of the facility of FIG. 4, the pressure in the pipe being equal to a second value strictly greater than the first value.

In other words, the scraper 20 has an uncrushed configuration, shown in FIG. 4, and a crushed configuration, shown in FIG. 5. The length L1 of the scraper 20, along the second axis A2, in the uncrushed configuration, is strictly greater than the length L2 of the scraper 20 in the crushed configuration.

The pressure threshold is strictly greater than the first pressure value and strictly lower than the second pressure value.

Furthermore, the scraper 20 is configured so that the crushing of the scraper 20 causes an increase in the outer diameter of the scraper 20 from the first value De1 to the second value De2. Thus, in the uncrushed configuration, the outer diameter of the scraper 20 has the first diameter value De1, whereas in the crushed configuration, the outer diameter has the second diameter value De2.

In one embodiment, in the crushed configuration, the outer diameter has a value strictly greater than the inner diameter Di of the circulation pipe 15 when the scraper 20 is not accommodated in the circulation pipe 15. Thus, when the scraper 20 is accommodated in the circulation pipe 15 in the crushed configuration, the outer diameter of the scraper 20 has the second diameter value De2 because the outer diameter of the scraper 20 is limited by the inner diameter Di. The scraper 20 then exerts, against the inner surface 25 of the circulation pipe 15, a frictional force tending to keep the scraper 20 in position relative to the circulation pipe 20.

For example, the shell 40 is made from a flexible polymer material and provided so that a central portion 57 of the shell 40 deforms radially toward the outside of the shell 40 when the end walls 46 are brought closer to one another.

The flexible polymer material is for example chosen from among a perfluorinated polymer, Teflon, polyamide and a polyolefin.

According to the example of FIGS. 1 and 5, the scraper 20 includes an elastic element 60.

The injector, the shell 40 and the elastic element 60 jointly form the holding system.

The elastic element 60 is accommodated in the chamber 45 delimited by the shell 40.

The elastic element 60 exerts, on the end walls 46, an elastic force seeking to separate the end walls 46 from one another. In particular, the elastic element 60 is configured to exert an elastic force having a value strictly greater than a pressure force tending to bring the end walls 46 closer to one another when the pressure in the circulation pipe 15 is below or equal to the pressure threshold.

The elastic element 60 is further configured to exert an elastic force having an intensity strictly greater than a pressure force tending to bring the end walls 46 closer to one another when the pressure in the circulation pipe 15 is strictly greater than the pressure threshold.

In other words, the elastic element 60 is configured to keep the scraper 20 in its uncrushed configuration when the pressure in the circulation pipe 15 is below or equal to the pressure threshold, and to allow the scraper 20 to switch to its crushed configuration when the pressure is strictly greater than the pressure threshold.

The elastic element 60 is, for example, a spring such as a helical spring. It should be noted that other types of elastic elements 60 can be considered.

The operation of the third example will now be described. In particular, a third example movement method implemented by the third example facility 10 will now be described.

During the circulation step, the pressure in the circulation pipe 15 has the first pressure value. The scraper 20 is therefore in its uncrushed configuration.

The third example comprises a step for increasing the pressure and a crushing step.

During the step for increasing the pressure, the injector increases the pressure in the circulation pipe from the first value to the second value. For example, the valve 22 allowing the first fluid F to exit from the circulation pipe 15 is closed, and the injector injects second fluid into the circulation pipe 15 until the second pressure value is reached.

During the crushing step, the scraper 20 switches into its crushed configuration under the effect of the pressure force exerted on the end walls 46. The crushing causes an increase in the outer diameter of the scraper 20 to the second diameter value De2.

When the scraper 20 is in its crushed configuration, the scraper 20 exerts a frictional force against the inner surface 25 of the circulation pipe 15, since the outer diameter is equal to the inner diameter Di.

The holding system then makes it possible to keep the scraper 20 in position in a particular portion of the circulation pipe 15 when the scraper 20 is crushed, while allowing a reduction in friction between the scraper 20 and the circulation pipe 15 due to the difference in the inner and outer diameters Di and De1 in the uncrushed configuration.

The holding system of the third example does not assume additional equipment except for the elastic element 60, relative to the first example. In particular, no additional element outside the scraper 20 is required. The fluid spraying facility 10 is therefore very simple, and the scraper 20 is capable of being used in pre-existing fluid spraying facilities 10.

According to a variant of the third example, the scraper 20 does not include an elastic element 60. The shell 40 includes two end portions 65 and one crushing portion 70.

The two end portions 65 delimit the scraper 20 along the second axis A2. In particular, each end wall 46 is a wall of an end portion 65. This end portion is delimited by the end wall 46 along the second axis 20.

Each end portion 65 is, for example, rigid. In particular, each end portion 65 is configured so as not to be deformed when the scraper 20 goes from the crushed configuration to the uncrushed configuration or vice versa.

The crushing portion 70 is inserted along the second axis A2 between the two end portions 65.

The crushing portion 70 is cylindrical and extends along the second axis A2. The crushing portion 70 therefore has a circular section in a plane perpendicular to the second axis A2.

The crushing portion 70 is configured to exert, on the two end portions 65, a force tending to separate the two end portions 65 from one another.

In particular, the crushing portion 70 is configured to exert an elastic force having a value strictly greater than a pressure force tending to bring the two end portions 65 closer to one another when the pressure in the circulation pipe 15 is below or equal to the pressure threshold.

The crushing portion 70 is further configured to exert an elastic force having a value strictly greater than a pressure force tending to bring the two end portions 65 closer to one another when the pressure in the circulation pipe 15 is strictly greater than the pressure threshold.

In other words, the crushing portion 70 is configured to keep the scraper 20 in its uncrushed configuration when the pressure in the circulation pipe 15 is below or equal to the pressure threshold, and to allow the scraper 20 to switch to its crushed configuration when the pressure is strictly greater than the pressure threshold.

The crushing portion 70 is for example made from an elastomer material. In this sense, the portion 70 can be qualified as elastomeric portion.

Figure 6:
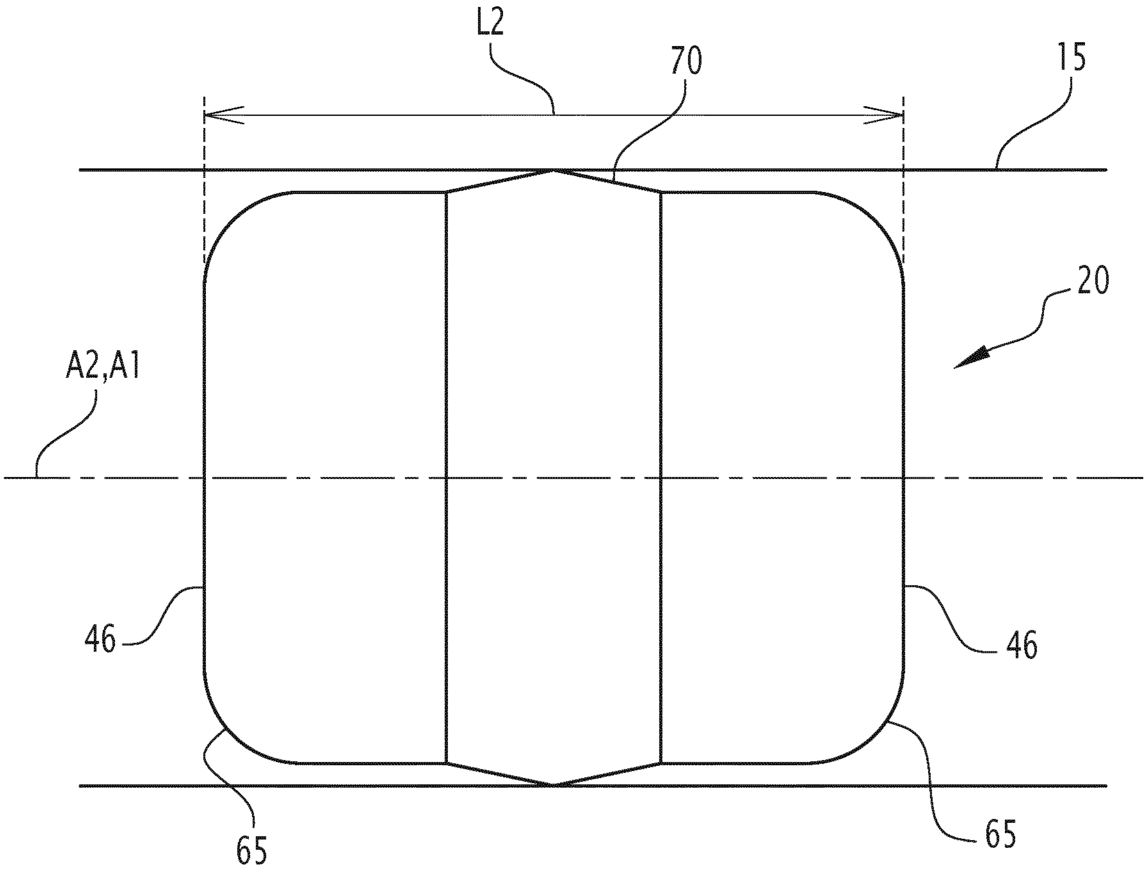
FIG. 6 is a partial schematic sectional illustration of a variant of the third example of a fluid spraying facility, the pressure in the pipe being equal to the second value.

The crushing portion 70 is configured to deform radially toward the outside of the shell 40 when the two end portions 65 are brought closer to one another, as shown in FIG. 6.

A fourth exemplary facility 10 will now be described.

The scraper 20 comprises a ferromagnetic element.

Ferromagnetism refers to the ability of certain bodies to become magnetized under the effect of an outside magnetic field and to retain a portion of that magnetization.

The ferromagnetic element is, in particular, secured to the shell 40.

The ferromagnetic element is, for example, received in the chamber 45.

The facility 10 comprises a magnetic field generator 55.

The magnetic field generator 55 is, for example, similar to the magnetic field generators 55 used in the second example previously described.

The magnetic field generator 55 is configured to generate, in at least one portion of the circulation pipe 15, a magnetic field tending to bring the ferromagnetic element closer to the magnetic field generator 55.

For example, the magnetic field generator 55 is a magnet generating a magnetic field capable of attracting the ferromagnetic element toward the magnet.

The method then comprises an attraction step for example replacing the pivoting step.

During the attraction step, the magnetic field generator 55 generates the magnetic field in the corresponding portion of the circulation pipe 15. For example, when the magnetic field generator 55 is a permanent magnet, the magnetic field generator 55 is brought closer to the portion of the circulation pipe 15 in which it is desired for the scraper 20 to be maintained.

Under the effect of the magnetic field, the ferromagnetic element is attracted toward the magnetic field generator 55. As a result, the scraper 20 is moved into the pipe 15 until coming into contact with the inner surface 25 of the pipe 15. In particular, the scraper 20 is pressed against the inner surface 25.

The scraper 20 is then kept in position in the portion of the pipe 15 by the effect of the magnetic field, which presses the scraper against the inner surface 25.

The fourth exemplary facility 10 is particularly simple to implement.

A method for spraying a first fluid F will now be described.

The spraying method is for example implemented by a spraying facility 10 according to one of the exemplary spraying facilities 10 previously described. However, it should be noted that the spraying method can be implemented by other types of fluid spraying facilities, in particular fluid spraying facilities in which the difference between the inner diameter Di of the circulation pipe 15 and the first value De1 is strictly less than 100 micrometers, for example equal to zero.

The method comprises a first spraying step, a circulation step, a return step and a second spraying step.

During the first spraying step, a first fluid F is sprayed by the spraying facility 10. In particular, the first fluid F is injected by the pump 12 into the circulation pipe 15 and transmitted by the circulation pipe 15 to the spraying member 13, which sprays the first fluid F.

The first fluid F is, for example, sprayed on a zone of an object, a structure or a facility that one wishes to cover with first fluid F.

The first fluid F sprayed during the first spraying step for example has a first color.

The first spraying step comprises determining a first volume of first fluid F. The first volume is the volume of first fluid F that has been sprayed since the beginning of the first spraying step.

The first volume is, for example, determined by knowing the flow rate of the pump 12 and the total operating duration of the pump 12 from the beginning of the first spraying step.

The first spraying step is implemented until a difference between a total volume of first fluid F to be sprayed and the first volume is equal to a predetermined second volume.

The total volume is, for example, the total volume of first fluid F to be sprayed by the facility 10 in order to make it possible to cover a predetermined object, or a predetermined zone of an object, a structure or a facility, with first fluid F.

The second volume is the volume of first fluid F that the scraper 20 is capable of moving during the circulation step. For example, the second volume is determined experimentally by filling the circulation pipe 15 with first fluid F and implementing the circulation step.

The second volume is, for example, greater than or equal to 80 percent (%) of the volume of the aperture of the circulation pipe 15.

The second volume is, for example, the volume of first fluid F contained in the circulation pipe 15. In particular, the second volume is the volume of the aperture of the circulation pipe 15.

In other words, the first spraying step is carried out until the volume of first fluid F that is contained in the circulation pipe 15 and that can be pushed back to the spraying member 13 by the scraper 20 is sufficient to cover, with first fluid F, the zones of the object, the structure or the facility that one wishes to cover F but that have not yet been covered.

The circulation step is implemented after the first spraying step.

During the circulation step, the scraper 20 is introduced into the circulation pipe 15, for example at the upstream end 15A of the circulation pipe 15, and the injector 21 injects the second fluid upstream from the scraper 20.

The second fluid used during the circulation step is, for example, a liquid, in particular a solvent capable of dissolving or diluting the first fluid F.

During the circulation step, the valve 22 is open.

The scraper 20 circulates from upstream to downstream in the circulation pipe 15, under the effect of the second fluid injected into the upstream end 15A by the injector 21. For example, the scraper 20 travels a length of the circulation pipe 15 greater than or equal to half of a total length of the circulation pipe 15, in particular greater than or equal to 90% of the total length.

The scraper 20 pushes back part of the first fluid F present in the circulation pipe 15 up to the spraying member 13, in particular up to the spray head 23.

During the circulation step, the second volume of first fluid F is pushed back by the scraper 20 to the spray head 23. In other words, during the circulation step, the volume of first fluid F passing through the valve 22 is equal to the second volume.

The first fluid F pushed back by the scraper 20 to the spray head 23 is sprayed by the spray head 23.

The return step is implemented after the circulation step.

During the return step, the injector 21 injects second fluid into the circulation pipe 15 downstream from the scraper 20. The second fluid then pushes the scraper 20 back, which moves in the upstream direction in the circulation pipe.

For example, the valve 17 is open to allow the second fluid to leave the circulation pipe 15 upstream from the scraper 20.

At the end of the return step, the scraper 20 is removed from the circulation pipe 15.

The return step is followed by the second spraying step.

The second spraying step is identical to the first spraying step with the exception of the first sprayed fluid F. In particular, during the second spraying step, the first fluid F injected by the pump 12 into the circulation pipe 15 and sprayed by the spraying member 13 is a different first fluid F from the first fluid F that is injected by the pump 12 during the first spraying step. In particular, the first fluid F sprayed during the second spraying step has a different color from the color of the first fluid F sprayed during the first spraying step.

The spraying method allows the use of a larger portion of the first fluid F that is present in the circulation pipe 15 owing to the use of the scraper 20 to push this first fluid F back to the spraying member 13. The spraying method therefore has a better efficiency in terms of quantity of fluid consumed than the other spraying methods, in which a portion of the consumed fluid remains in the circulation pipe 15 at the end of the spraying, and is effectively not recovered.

When the second fluid is a liquid, the control of the second volume of sprayed fluid is improved, since the liquids are weakly compressible.

When this liquid is a solvent, the first fluid F remaining in the circulation pipe 15 after the passage of the scraper 20, in particular the first fluid F capable of partially covering the inner surface 25, is dissolved or diluted by the solvent and extracted from the pipe 15 with the solvent. The pipe 15 is therefore partially cleaned, and the risks of contamination of the first fluid F sprayed during the second spraying step by the first fluid F sprayed during the first spraying step are limited.

The cleaning of the pipe 15 is further improved when the return step is implemented using this solvent used as second fluid, since the circulation pipe 15 is then cleaned twice by the solvent, during the circulations of the scraper in the downstream direction, then the upstream direction.

When the scraper 20 is according to the scrapers 20 described in the first, second, third and fourth preceding examples, that is to say, when a difference between the inner diameter Di of the circulation pipe 15 and the first value De1 is greater than or equal to 100 micrometers (μm), the scraper 20 circulates easily even in the portions of the circulation pipe 15 that are not straight, in particular in the second portion 29, which is helical. The quantity of first fluid F recovered is then increased, since a section of the pipe 15 unable to be traveled by the scraper 20 is then prevented from being filled with first fluid at the end of the circulation step.

The use of a second helical portion 29 makes it possible to prevent the formation, in the first fluid F contained in the second portion 29, of conductive connections under the effect of the electrical fields frequently used to spray first fluid F when the first fluid F contains electrically conductive particles. The scrapers 20 according to the first, second, third and fourth examples are therefore particularly interesting for these applications.

A fifth exemplary facility 10 will now be described.

The elements identical to the first example facility 10 are not described again. Only the differences are shown.

However, it should be noted that, in the fifth example facility 10, the difference between the inner diameter Di of the circulation pipe 15 and the first value De1 can vary, in particular can be strictly less than 100 μm, for example equal to zero, or can be greater than or equal to 100 μm, as is the case in the first example.

When this difference is greater than or equal to 100 μm, the fifth example facility 10 can comprise a scraper 20 and a holding system 55 according to the scrapers 20 and the holding systems of the second, third and fourth example facilities 10 and the variants previously described these second, third and fourth examples.

According to one variant that can also be considered, the fifth example facility 10 does not include a scraper 20.

The injector 21 is configured to inject the second fluid into at least one from among the color-changing unit 11, the pump 12, the circulation pipe 15 and the spraying member 13. According to the embodiment shown in FIG. 7, the injector 21 is connected to the color-changing unit 11 by a valve 105, to the pump 12 by a valve 110, to the circulation pipe 15 by the valve 47 and to the spraying member 13 by a valve 115.

The second fluid is then a liquid, for example a liquid solvent capable of dissolving or diluting the first fluid F, or water.

The injector 21 is configured to inject a predetermined volume of second fluid into the circuit 16. The injector 21 is further configured to stop the injection when the injected volume is equal to a predetermined volume.

For example, the injector 21 is configured to estimate a value of a total volume of second fluid injected into the circuit 16 from the beginning of the injection, and to stop the injection when the total volume is equal to the predetermined volume.

According to one embodiment, the injector 21 includes a control module such as a data processing unit or a dedicated integrated circuit, capable of estimating the total injected volume and commanding the injection of the second fluid by the injector 21, for example capable of commanding the opening or the closing of the valves 47, 105, 110, 115. The predetermined volume is chosen as a function of the quantity of second fluid that one wishes to inject into the circuit 16. The predetermined volume is therefore capable of varying.

Examples of injectors 21 capable of being used in the fifth example are described below.

The injector 21 is further configured to inject a gas stream into the circuit 16. In particular, the injector 21 is configured to inject the predetermined volume of second fluid into the circuit 16, and next to inject the gas into the circuit 16 in order to cause the movement of the second fluid in the circuit 16.

For example, the injector 21 is connected to a pressurized gas source.

The gas is for example compressed air.

The gas has a third pressure value when the gas is injected into the circuit 16. The third pressure value is less than or equal to 20 bars.

The fifth example facility 10 is capable of implementing a method comprising a step for injecting the second fluid into the circuit 16.

For example, during the injection step, the second fluid is injected into the circulation pipe 15.

In a variant, the second fluid is injected into at least one from among the color-changing unit 11, the pump 12, the circulation pipe 15, the spraying member 13.

During the injection step, the injector 21 estimates the volume of second fluid injected from the beginning of the injection step. For example, the injector 21 periodically estimates the volume of second fluid injected from the beginning of the injection step. According to one embodiment, the injector 21 estimates the volume of second fluid injected with a period less than or equal to 100 milliseconds. The estimated volume is compared by the injector 21 to the predetermined volume.

If the estimated volume of second fluid is strictly less than the predetermined volume, the injector 21 continues the injection of the second fluid in the circuit 16.

If the estimated volume is greater than or equal to the predetermined volume, the injector 21 stops the injection. For example, the injector 21 forms the valve(s) 47, 105, 110 and 115 that connect the injector 21 to the circuit 16.

Figure 7:
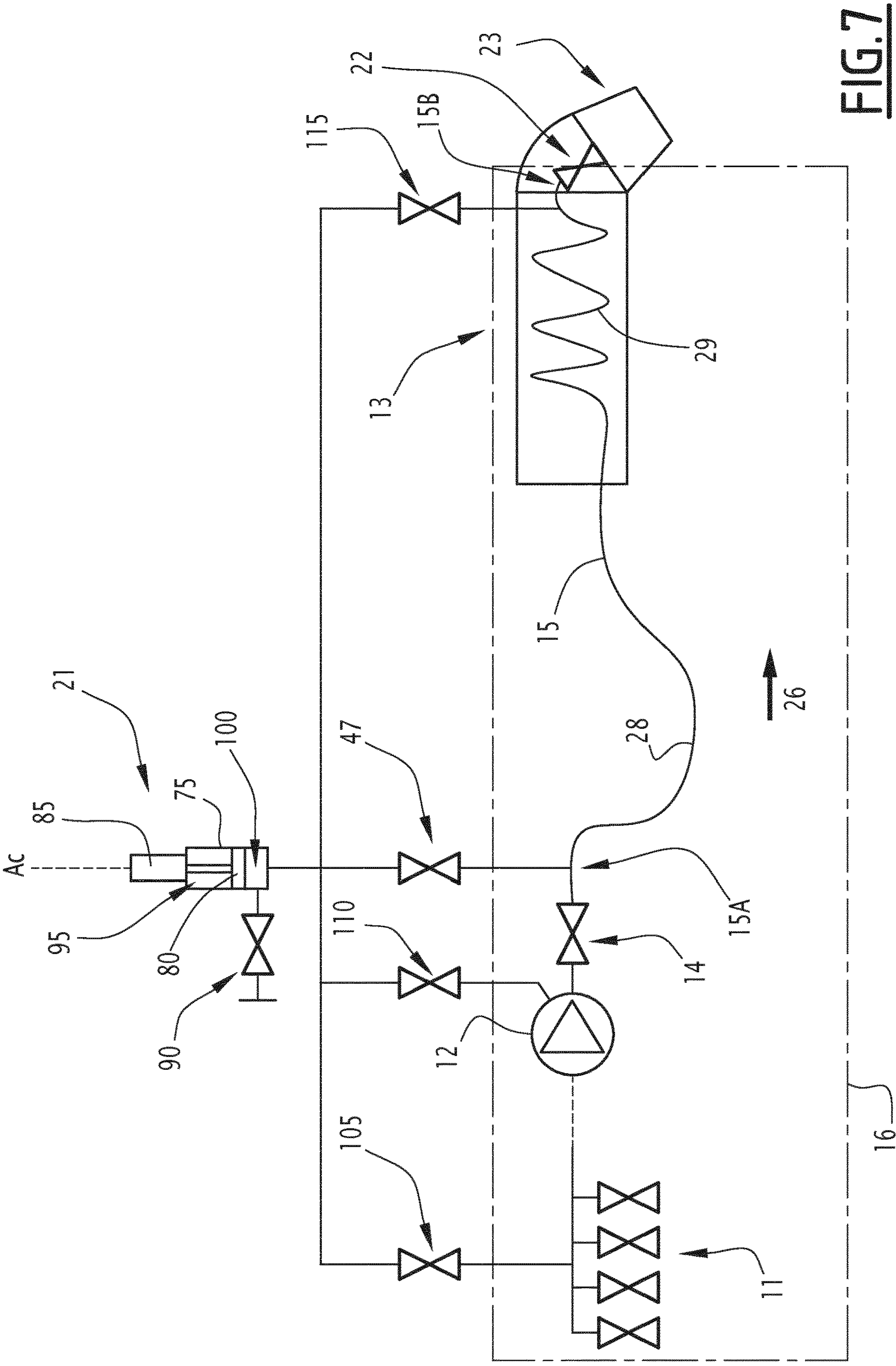
FIG. 7 is a partial schematic sectional illustration of another example of a fluid spraying facility.

According to the example shown in FIG. 7, the injector 21 includes a cylinder 75, a piston 80, an actuator 85 and a valve 90.

The cylinder 75 is configured to contain the second fluid. For example, the cylinder 75 delimits a cylindrical cavity capable of accommodating the second fluid.

The cylinder 75 extends along an axis Ac specific to the cylinder 75.

It should be noted that the cylinder 75 is capable of having a circular base, but also a polygonal base, or a base having any shape in a plane perpendicular to the axis Ac of the cylinder 75.

The cylinder 75 is for example made from a metallic material such as stainless steel or aluminum. The cavity delimited by the cylinder 75 has an inner volume of between 50 cubic centimeters (cc) and 1000 cc.

The piston 80 is accommodated in the cavity delimited by the cylinder 75. The piston 80 separates the cavity delimited by the cylinder 75 into two chambers 95, 100 of variable volume.

The piston 80 is cylindrical, for example delimited by a peripheral face complementary to an inner face of the cylinder 75 and by two faces perpendicular to the axis of the cylinder 75.

The piston 80 is for example made from a metallic material. According to one embodiment, the face of the piston 80 that delimits the chamber 100 is made from stainless steel. In a variant, this face is made from a polymer, or covered with a layer of polymer, or a layer of polytetrafluoroethylene (PTFE).

The piston 80 is translatable between a primary position and a secondary position relative to the cylinder 75 so as to vary the respective volumes of the chambers 95 and 100. In particular, the piston 80 is movable along the axis Ac of the cylinder 75.

The primary position is the position in which the volume of the chamber 100 is largest. When the piston 80 is in the primary position, the volume of the chamber 95 is for example equal to zero.

The secondary position is the position in which the volume of the chamber 100 is smallest. For example, when the piston 80 is in the secondary position, the piston 80 bears against an end wall of the cylinder 75, such that the volume of the chamber 100 is equal to zero.

The piston 80 is configured to prevent the passage of second fluid between the chambers 95, 100 that delimits. For example, the piston 80 bears sealing means such as a seal surrounding the piston 80 in a plane perpendicular to the axis of the cylinder 75.

The chamber 100 is configured to be at least partially filled with second fluid. For example, the chamber 100 is connected by the valve 90 to a source of second fluid, such as a reservoir.

The chamber 100 is capable of being connected, for example by the valve 47, to the circulation pipe 15. According to the example of FIG. 7, the chamber 100 is capable of being connected to the upstream end 15A of the circulation pipe. In a variant, the chamber 100 is capable of being connected to the downstream end 15B, or to both ends 15A, 15B.

The actuator 85 is configured to move the piston 80 between its primary and secondary positions. The actuator 85 for example comprises a motor and a rod capable of transmitting a force from the motor to the piston 80 in order to move the piston 80.

The actuator 85 is in particular configured to determine a position of the piston 80 relative to the cylinder 75, and to command or stop a movement of the piston 80 as a function of the determined position. Many types of actuators 85 allows such a determination of the position of the piston.

The motor is, for example, an electric motor such as a torque motor, or a brushless motor.

According to one embodiment, the motor is a servomotor, that is to say, a position-slaved motor. For example, the motor is controlled so as to keep the piston 80 in a predetermined position relative to the cylinder 75, the predetermined position being able to vary.

In a variant, the motor is replaced by a pneumatic or hydraulic member capable of moving the piston 80, for example a pump capable of injecting a liquid into the chamber 95 to move the piston.

The actuator 85 is in particular configured to impose a pressure on the second fluid greater than or equal to the third pressure value. For example, a pressure sensor is integrated into the chamber 100, and the control module is capable of commanding an increase in the force exerted by the actuator on the piston 80 until the pressure of the second fluid in the chamber 100 is greater than or equal to the third pressure value.

In a variant, the actuator 85 is configured to estimate the pressure of the fluid in the chamber 100 from values of an electric supply current of the electric motor of the actuator 85.

During the injection step, the chamber 100 contains second fluid and the actuator 85 moves the piston 80 toward the secondary position. For example, during the injection step, the chamber 100 is filled with second fluid.

Under the effect of the movement of the piston 80, the second fluid is injected into the circulation pipe 15.

The actuator 85 periodically determines a position of the piston 80 in the cylinder 75, in particular a distance traveled by the piston 80 along the axis of the cylinder 75 from the primary position. The determination of the distance traveled is equivalent to the determination of the injected volume, since the injected volume is a bijective function of the distance traveled, that is to say, a distance traveled corresponds to a single injected volume.

In a variant, the actuator 85 compares the total injected volume to the predetermined volume by determining whether the piston 80 has reached a predetermined position corresponding to the predetermined volume.

The predetermined position is in particular a position such that the movement of the piston from the primary position to the secondary position decreases the volume of the chamber 100 by a volume value equal to the predetermined volume.

The injector 21 is further configured to stop the injection when the injected volume is equal to a predetermined volume.

For example, if the piston 80 has not reached the predetermined position, the actuator 85 continues to move the piston 80 toward the secondary position.

If the piston 80 is in the predetermined position, the actuator 85 stops moving the piston 80.

In a variant, the injector 21 is configured to close the valve 47 when the piston 80 reaches the predetermined position. It should be noted that other types of injectors 21 can be used in the fifth example.

For example, the injector 21 includes a source of second fluid and a flowmeter.

The source of second fluid is, for example, a second fluid reserve under a pressure greater than or equal to the third pressure value, or a pump capable of generating a second fluid stream, such as a gear-type pump or a peristaltic pump.

The injector 21 for example includes a pressure sensor located in particular in the outlet pipe of the source of second fluid, and capable of measuring the pressure of the second fluid leaving the source.

The flowmeter is capable of measuring values of the flow rate of second fluid injected by the injector 21 in the circuit 16.

The flow rate is, for example, a volume flow rate. In a variant, the flow rate is a mass flow rate.

The injector 21 is configured to estimate, from measured flow rate values, the total volume of second fluid injected into the circuit from the flow rate of the injection step. For example, the injector 21 estimates the total injected volume by temporal integration of the measured flow rate values.

The injector 21 interrupts the injection when the total volume is equal to the predetermined volume. For example, the injector 21 closes the valves 47, 105, 110, 15 connecting the injector 21 to the circuit 16.

The injection step is, for example, implemented during a circulation step as previously defined. In this case, the scraper 20 circulates from upstream to downstream in the circulation pipe 15 under the effect of the injected second fluid.

In a variant or additionally, the injection step is implemented during the return step to propel the scraper 20 from downstream to upstream.

The fifth example facility 10 is in particular capable of implementing the spraying method previously described, as well as other spraying methods.

For example, the fifth example facility 10 is capable of implementing a spraying method in which, during the circulation step, no scraper 20 is present in the pipe 15. In this case, during the circulation step, the second fluid pushes the first fluid F back in front of it up to the spraying member 13.

According to other possible variants, the injection step is implemented during a method for cleaning at least one from among the color-changing unit 11, the pump 12 and the spraying member 13.

The use of an injector 21 capable of stopping the injection of the second fluid when the injected volume of second fluid is equal to a predetermined volume allows precise control of the quantity of second fluid used during the injection step. In particular, this volume does not depend on the viscosity of the first fluid F (or the mixing between the first fluid F and the second fluid) present in the circuit 16, on the contrary, methods of the state of the art in which a source of second fluid is connected to the circuit 16 during a predetermined time, since the viscosity of the fluid(s) contained in the circuit depends inter alia on the ratio between the first fluid F and the second fluid present in the circuit 16.

This is particularly interesting during a circulation step comprising the spraying of the first fluid F pushed back by the scraper 20 or by the second fluid, since the sprayed volume of first fluid F is then well controlled.

The use of a piston 80 to inject the second fluid into the circulation pipe 15 in particular allows more precise control of the injected volume of second fluid, in particular when this fluid is a liquid such as a solvent, than allowed by the injectors 21 of the state of the art. The injectors of the state of the art that use pumps such as gear-type pumps have a flow rate that may vary as a function of the average viscosity. For example, gear-type pumps have internal leaks that depend on this viscosity. As a result, the volume of liquid actually injected into the circulation pipe F by the injectors of the state of the art is not effectively controlled. On the contrary, the piston 80, through its movement, makes it possible to impose a volume of propulsion liquid actually injected, since this volume depends solely on the volume variation of the chamber 100. The fifth example facility 10 therefore allows better control of the injected quantity of second fluid.

The estimate of the injected volume of second fluid from the distance traveled by the piston 80 is a method allowing a precise and simple estimate of the injected volume quantity without an apparatus other than the cylinder 75, the piston 80 and the actuator 85 being necessary.

Injectors 21 estimating the volume of second fluid actually injected from measured flow rate values also allow better control of the injected quantity of second fluid.

The injection of the second fluid with a pressure greater than or equal to the pressure of the gas makes it possible to use the gas to propel the second fluid, and therefore reduces the quantity of second fluid necessary.

The estimate of this pressure from the electric current consumed makes it possible to eliminate the need for a sensor, and therefore to simplify the facility 10.

A sixth example of the facility 10 will now be described.

The sixth example differs from the second example in that the holding system in the sixth example comprises the magnet 50 and at least one ferromagnetic element 56.

The magnet 50 is, in particular, a permanent magnet.

The magnet 50 is configured to generate a magnetic field capable of generating a force having a value of between 1 newton (N) and 10 N, as shown below.

In this variant, the third axis A3 coincides, for example, with the second axis A2.

However, it is also possible to use embodiments wherein the A2 and A3 axes do not coincide. In general, the orientation of the third axis A3 in relation to the second axis A2 of the scraper 20 is likely to vary.

Each ferromagnetic element 56 is made of a ferromagnetic material, in particular a soft ferromagnetic material.

Ferromagnetism refers to the ability of certain bodies to magnetize themselves under the effect of an external magnetic field and to retain some of this magnetization when the magnetic field is interrupted.

Examples of ferromagnetic materials are iron, nickel, chromium dioxide, gadolinium and some steels.

Alternatively, the ferromagnetic material is a steel, for example a steel rich in iron. For example, a surface treatment of the steel making up ferromagnetic element 56 is provided to protect the ferromagnetic element from corrosion.

Each ferromagnetic element 56 is arranged close to at least a portion of the circulation pipe 15 so that the magnet 50 is attracted to the ferromagnetic element 56 when the scraper 20 is received in said portion of the circulation pipe 15.

The ferromagnetic element 56 is in contact with the outer surface 27 of at least a portion of the pipe 15, for example. Alternatively, the ferromagnetic element 56 is at least partially included in the circulation pipe 15. In particular, the ferromagnetic element 56 is at least partially included between the outer surface 27 and the inner surface 25 of the pipe 15.

According to one embodiment, the ferromagnetic element 56 or the ferromagnetic elements 56 extend along the circulation pipe 15 over a length of extension greater than or equal to half the length of the circulation pipe 35. For example, the extension length is greater than or equal to three-quarters of the length of circulation pipe 15, including greater than or equal to 90 percent (%) of the length of circulation pipe 15.

Each ferromagnetic element 56 is a wire, a sheet, a chain, for example, or a block of ferromagnetic material.

The holding system comprises, for example, a single ferromagnetic element 56 extending over the extension length along the circulation pipe 15. Alternatively, when the holding system comprises a plurality of ferromagnetic elements 56, for example, the ferromagnetic elements 56 are arranged successively along the circulation pipe 15, in which case the extension length is measured between the ends of the ferromagnetic elements 56 furthest apart from each other. A distance between two successive ferromagnetic elements is between 0.5 mm and 5 mm, for example.

When the holding system consists of a single ferromagnetic element 56, the extension length is measured between two ends of the ferromagnetic element 56.

The ferromagnetic element 56 is a wire or chain, for example, extending along the pipe 15 over the extension length. The wire or chain is a straight wire, for example.

Alternatively, when the holding system comprises a single ferromagnetic element 56, the single ferromagnetic element 56 surrounds the circulation pipe 15 in a plane perpendicular to the first axis A1, for example.

For example, the ferromagnetic element 56 is a sheet applied to the outer surface 27.

Alternatively, the ferromagnetic element 56 is a longitudinal ferromagnetic element 56, such as a wire, cable or chain, wrapped around the circulation pipe 15, for example extending along a helix, such as a circular helix.

A helix is a curve whose tangent at each point makes a constant angle with a given direction, this direction being in particular the first axis A1.

A radius is defined for the helix. The radius is between 4 mm and 18 mm.

A pitch is defined for the helix. The pitch is defined, in particular, as the distance between two points of the helix delimiting a portion of the helix corresponding to a full turn around the first axis A1. The pitch is between 0.5 mm and 5 mm.

As an optional addition, the facility 10 also includes a cylindrical sheath, made of elastomer, polyamide, or Teflon for example.

Each ferromagnetic element 56 is interposed between the circulation pipe 15 and the sheath. In particular, the sheath is configured to press each ferromagnetic element 56 against the outer surface 27 of the circulation pipe 15. For example, the sheath has an inner diameter equal to the outer diameter of circulation pipe 15.

The sheath is a sealed sheath, for example, configured to prevent a liquid from reaching each ferromagnetic element 56.

The sheath has a thickness of between 0.5 mm and 1.5 mm, for example.

This thickness and the inner diameter of the sheath may vary.

In particular, the magnet 50 and the ferromagnetic element 56 are configured to exert a force of between 1 N and 10 N on the scraper 20 when the scraper 20 is received in the circulation pipe 15, so that the scraper 20 is held in position in the circulation pipe 15.

In particular, when the scraper 20 is inserted in the circulation pipe 15, a distance, measured in a direction perpendicular to the first axis A1, between the ferromagnetic element 56 and the magnet 50 is between 0.5 mm and 3 mm.

When the ferromagnetic element 56 is a wire or cable, a diameter of the wire or cable is between 0.4 mm and 2 mm, for example.

Figure 8:
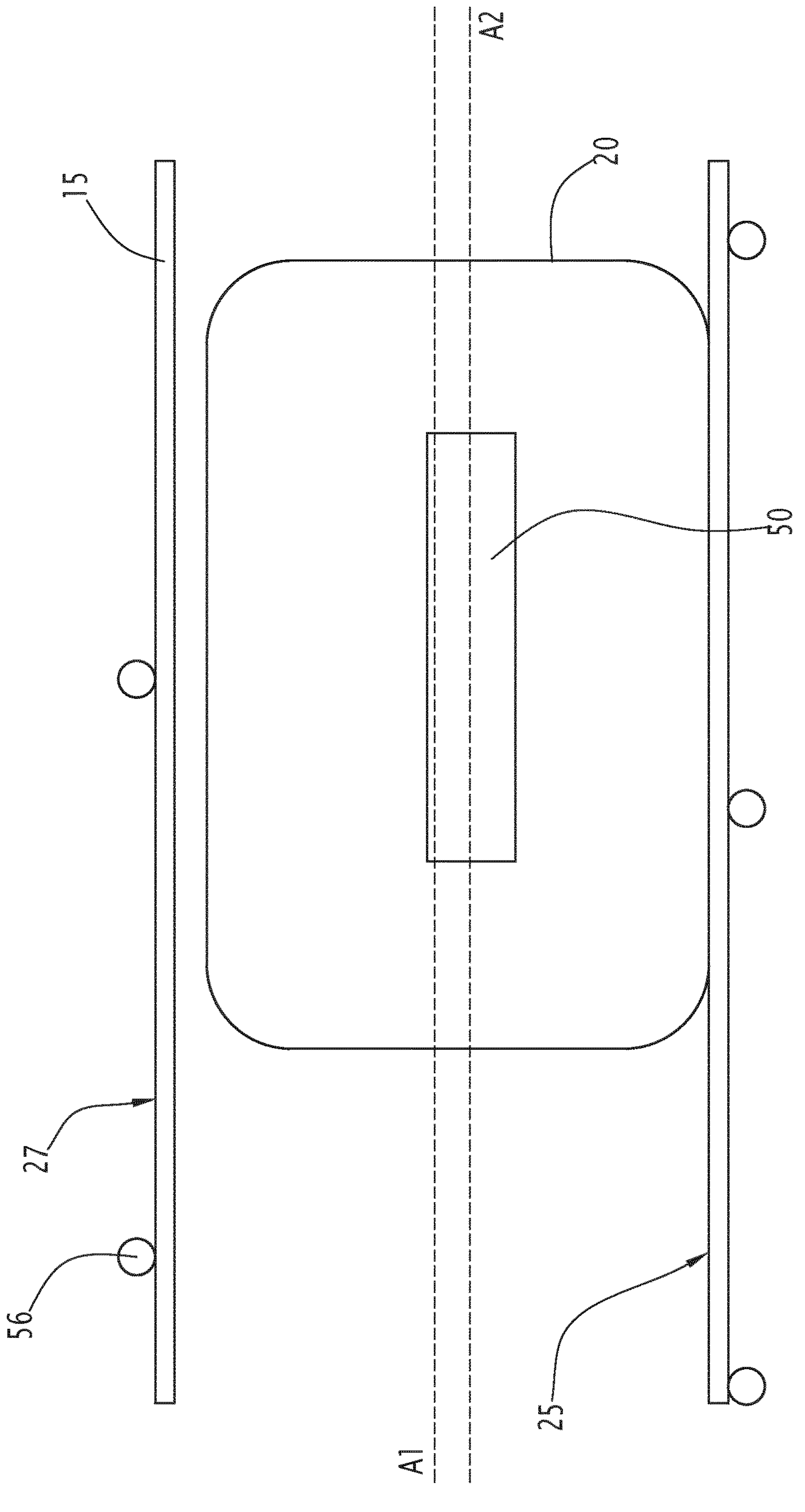
FIG. 8 is a partial schematic representation of another example of a fluid spraying facility.

Thanks to the magnet 50 and the ferromagnetic element or ferromagnetic elements 56, when the flow of the second fluid is interrupted, for example during a pause in spraying, the magnet 50 and the ferromagnetic element 56 exert a force on the scraper 20 intended to press the scraper 20 against the inner surface 25, for example by swiveling the scraper 20 or simply by bringing the magnet 50 and the ferromagnetic element 56 together, as shown schematically in FIG. 8. Thus, the scraper 20 is held in position in the pipe 15 even when the second fluid is not flowing. In addition, no additional device, such as an electromagnet or a moving part, is required to hold the scraper 20 in position.

In contrast, when the flow of the second fluid flows through the pipe 15, this flow propels the scraper 20 along the pipe despite the presence of the holding system. The facility 10 therefore has a simplified operation since it is not necessary to activate the holding system, as the interruption of the second fluid flow is sufficient to hold the scraper 20 in position.

In addition, the scraper 20 can be held in position at any point on the pipe 15 between the ends of the ferromagnetic element(s) between which the extension length is measured. The cleaning method is therefore simplified, since it is not necessary for the scraper 20 to be in a precise position to allow it to be held. This is all the more significant when the extension length is greater than or equal to half the length of the pipe 15.

The use of a ferromagnetic element 56 wrapped around the pipe 15 ensures a good flexibility of the assembly formed by the pipe 15 and the ferromagnetic element 56 while ensuring a good connection of these two elements even during deformations of the pipe 15. Such a ferromagnetic element 56 is therefore particularly suitable for applications in which the projection device 13 is mobile, especially when this device 13 is mounted on a mobile arm, since significant deformations of the pipe 15 are frequent at the wrist of the robotic arm.

The use of a sheath, here again, also ensures a good connection between the ferromagnetic element(s) 56 and the circulation pipe 15, without compromising the flexibility of the latter, and ensures the protection of each ferromagnetic element 56 against corrosion.

The invention corresponds to any technically possible combination of the embodiments described above.

The invention claimed is:

1. A fluid spraying facility comprising:

a fluid circulation pipe extending along a first axis and having a circular section and an inner diameter;

a scraper extending along a second axis and having a circular section and an outer diameter, wherein the scraper is configured to circulate in translation relative to said pipe along the first axis when the first axis and the second axis are merged, wherein the scraper is configured to push back fluid present in said pipe in front of the scraper when the scraper circulates in said pipe, and wherein a difference between the inner diameter of said pipe and the outer diameter of said scraper is greater than or equal to 100 micrometers; and a holding system capable of preventing a relative translational movement of said scraper with respect to said pipe when said scraper is inserted in said pipe, configured to rotate said scraper around an axis perpendicular to the first axis such that an angle between the first axis and the second axis is strictly greater than zero, wherein said scraper comprises a magnet having a north pole and a south pole, the poles of the magnet being aligned along a third axis, an angle between the second axis and the third axis being strictly greater than zero, and wherein said holding system comprises a magnetic field generator capable of generating in at least a portion of said pipe a magnetic field intended to align the third axis and the first axis.

2. The fluid spraying facility according to claim 1, wherein said magnetic field generator is in contact with an outer surface of said pipe.

3. The fluid spraying facility according to claim 1, wherein said magnetic field generator is at least partially located between an inner surface and an outer surface of said pipe.

4. The fluid spraying facility of claim 1 wherein the difference between the inner diameter of said pipe and the outer diameter of said scraper is greater than or equal to 200 micrometers.

5. The fluid spraying facility according to claim 1, wherein the angle between the first axis and the second axis is greater than or equal to 0.5 degrees.

6. The fluid spraying facility according to claim 1, wherein the angle between the second axis and the third axis is greater than or equal to 5 degrees.

7. The fluid spraying facility according to claim 1, wherein a said holding system is configured to rotate said scraper so that ends of said scraper are pressed against an inner surface of the fluid circulation pipe, which prevents, by friction, relative translational movement of said scraper with respect to said pipe.

8. A method for moving a fluid in a fluid spraying facility comprising a fluid circulation pipe, the method comprising:

circulating a scraper in the pipe, the scraper pushing back fluid present in the pipe in front of the scraper during the circulating, wherein the pipe and the scraper each has a cylindrical section, wherein the pipe has an inner diameter, wherein the scraper has an outer diameter, wherein the pipe extends along a first axis, wherein the scraper extends along a second axis and is configured to circulate in translation relative to the pipe along the first axis when the first axis and the second axis are merged, and wherein a difference between the inner diameter of the pipe and the outer diameter value of the scraper is greater than or equal to micrometers; and pivoting, implemented by a holding system capable of preventing a relative translational movement of the scraper with respect to the pipe when the scraper is inserted in the pipe, the pivoting comprising rotating the scraper around an axis perpendicular to the first axis such that an angle between the first axis and the second axis is strictly greater than zero, wherein said scraper comprises a magnet having a north pole and a south pole, the poles of the magnet being aligned along a third axis, an angle between the second axis and the third axis being strictly greater than zero, and wherein said holding system comprises a magnetic field generator capable of generating in at least a portion of said pipe a magnetic field intended to align the third axis and the first axis.

9. The method of claim 8, wherein the difference between the inner diameter of the pipe and the outer diameter value of the scraper is greater than or equal to 200 micrometers.

10. The method of claim 8, wherein the angle between the first axis and the second axis is greater than or equal to 0.5 degrees.

11. The fluid spraying facility according to claim 8, wherein said rotating rotates the scraper so that ends of the scraper are pressed against an inner surface of the fluid circulation pipe, which prevents, by friction, relative translational movement of the scraper with respect to the pipe.

* * * * *